March 13, 1928. 1,662,581
L. E. LA BRIE
TWO-PART WHEEL
Original Filed Oct. 15, 1923
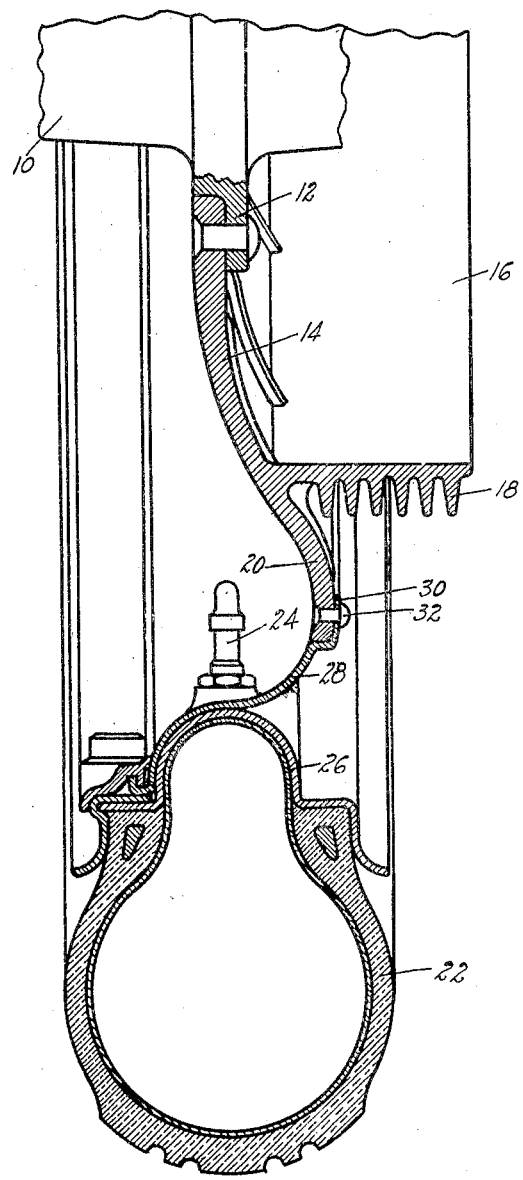
INVENTOR
LUDGER E. LA BRIE
BY
*M. W. McConkey*
ATTORNEY Patented Mar. 13, 1928.

1,662,581

UNITED STATES PATENT OFFICE.

LUDGER ELIZE LA BRIE, OF SOUTH BEND, INDIANA, ASSIGNOR TO MOTOR INDUSTRIES, INC., A CORPORATION OF ILLINOIS.

TWO-PART WHEEL.

Original application filed October 15, 1923, Serial No. 668,709. Divided and this application filed September 21, 1925. Serial No. 57,558.

This invention relates to wheels, and is illustrated as embodied in a disk wheel for an automobile. Objects of the invention are to provide a wheel which is exceptionally strong where strength is required, but light where lightness is permissible, and arranged to afford access to the tire valve from the outer side of the wheel.

In one desirable arrangement the wheel is made in two parts, the midsection forming the major part of the wheel being relatively strong and heavy, as for example a casting, and preferably formed with a brake drum, the midsection terminating in a flange projecting radially outward. The outer rim-carrying part may be a relatively light stamping, and in the arrangement illustrated it rests on the edge of the midsection flange and overlaps and is secured to the side of the flange.

To render the tire valve accessible from the outer side of the wheel, the midsection preferably flares from a center in the midplane of the wheel, to the above described flange offset inwardly from the midplane, with the outer part if desired flaring back across the midplane into engagement with the rim.

These and other features of the invention will be apparent from the following description of one illustrative embodiment shown in the accompanying drawing, in which:

The figure is a radial section through one-half of the novel wheel.

The wheel illustrated includes a hub 10 having a flange 12, to which is riveted in the midplane of the wheel the inner edge of a cast midsection 14 integral with a brake drum 16 having heat-radiating ribs or fins 18. The midsection 14 flares inwardly from the midplane of the wheel, and terminates in a flange 20 projecting radially outward.

The tire 22, having a straight valve 24, is carried by a rim 26 secured to the relatively light outer part 28 of the wheel, part 28 preferably being a stamping pressed from sheet metal. Part 28 is formed with a shoulder resting on the edge of flange 20, and terminates in a flange 30 overlapping the inner face of flange 20 at its outer edge and secured thereto by rivets 32. It will be observed that part 28 flares outwardly across the midplane of the wheel, intersecting valve 24, so that the valve is accessible from the outer side of the wheel.

While one illustrative embodiment has been described in detail, it is not my intention to limit the scope of the invention to that particular embodiment, or otherwise than by the terms of the appended claims. The present application is a division of my copending application No. 668,709, filed October 15, 1923.

I claim:

1. A wheel comprising a relatively heavy midsection formed with a brake drum and flared inwardly from the midplane of the wheel at its outer edge, in combination with a relatively light annular part secured thereto and carrying a rim and tire and flaring back across the midplane of the wheel, with the valve of the tire projecting through the annular part and accessible from the front of the wheel.

2. A wheel comprising a relatively heavy midsection flared inwardly from the midplane of the wheel at its outer edge, in combination with a relatively light annular part secured thereto and carrying a rim and tire and flaring back across the midplane of the wheel, with the valve of the tire projecting through the annular part and accessible from the front of the wheel.

3. A wheel comprising a relatively heavy midsection forming the major part of the wheel, in combination with a relatively light annular rim-carrying outer part having a shoulder engaging and resting on the outer edge of the midsection and terminating in an inner flange overlapping the outer part of the inner face of the midsection.

4. A wheel comprising a midsection forming the major part of the wheel, in combination with an annular rim-carrying outer part having a shoulder engaging and resting on the outer edge of the midsection and terminating in an inner flange overlapping the outer part of the inner face of the midsection.

5. A wheel comprising a midsection having an integral brake drum and forming the major part of the wheel, in combination with an annular rim-carrying outer part having a shoulder engaging and resting on the outer edge of the midsection and terminating in an inner flange overlapping the outer part of the inner face of the midsection.

6. A wheel comprising a relatively heavy midsection having its center in the midplane of the wheel and flaring inwardly of said midplane, in combination with a rim and tire and a relatively light annular outer part carrying the rim and secured to the midsection at its outer edge, the valve of the tire being in said midplane of the wheel and accessible from the front of the wheel.

7. A wheel comprising a relatively heavy midsection having its center in the midplane of the wheel and flaring inwardly of said midplane, in combination with a rim and tire and a relatively light annular outer part carrying the rim and secured to the midsection at its outer edge, the valve of the tire being in said midplane of the wheel and accessible from the front of the wheel, the annular rim-carrying part flaring outwardly across the midplane of the wheel and intersecting the valve.

In testimony whereof, I have hereunto signed my name.

LUDGER ELIZE LA BRIE.